United States Patent [19]

Small

[11] Patent Number: 4,980,185

[45] Date of Patent: Dec. 25, 1990

[54] METHOD FOR MAKING MEAT PRODUCTS HAVING A REDUCED SATURATED FAT AND CHOLESTEROL CONTENT

[75] Inventor: Donald M. Small, Quincy, Mass.

[73] Assignee: Trustees of Boston University, Boston, Mass.

[21] Appl. No.: 381,233

[22] Filed: Jul. 18, 1989

[51] Int. Cl.[5] .............................................. A23L 1/31
[52] U.S. Cl. ................................ 426/417; 260/412.6; 426/429; 426/438; 426/441
[58] Field of Search ............... 426/641, 646, 417, 438, 426/441, 478, 480, 429; 260/412.6

[56] References Cited

U.S. PATENT DOCUMENTS

| | | | |
|---|---|---|---|
| 3,428,462 | 2/1969 | De Lara | 426/417 X |
| 4,262,028 | 4/1981 | Meyer et al. | 426/417 |
| 4,778,682 | 10/1988 | Chapman | 426/248 |

*Primary Examiner*—Arthur L. Corbin
*Attorney, Agent, or Firm*—David Prashker

[57] ABSTRACT

A method for reducing the cholesterol content and saturated fat content of red meat and fowl is provided. The processing employs a heated unsaturated oil to solubilize the saturated fat and cholesterol of fragmented meat and then employs an aqueous fluid to separate and remove the extracting oil from the oil processed meat. The invention not only includes methods for such processing, but also provides meat having markedly reduced saturated fat, reduced total fat, and reduced cholesterol content; an aqueous meat flavoring and stock agent; and an oil containing concentrated amounts of cholesterol and saturated fat which may be employed for food in which cholesterol and saturated fat are not a concern or for non-food uses.

19 Claims, 1 Drawing Sheet

METHOD FOR MAKING MEAT PRODUCTS HAVING A REDUCED SATURATED FAT AND CHOLESTEROL CONTENT

FIELD OF THE INVENTION

The present invention is concerned with the dietary health risks of persons eating a high cholesterol, high saturated fat diet; and is particularly directed to methods of reducing the saturated fat and cholesterol content of meat and meat products as major means for reducing risk of atherosclerosis and heart disease.

BACKGROUND OF THE INVENTION

Cholesterol is a polycyclic steroidal alcohol found in all body tissues, especially in animal meats, fats and oils. For nutritional and human health purposes, cholesterol is typically measured by determining its concentration in the serum or plasma, in which the normal range concentration is usually given as between 140-240 mg/dl. About three-fourths of the serum cholesterol is esterified with unsaturated long-chain fatty acids; the remainder of the serum cholesterol is present in the free cholesterol form.

For medical and diagnostic purposes, serum cholesterol is associated with the high-density lipoprotein (HDL) and low-density lipoprotein (LDL) fractions in a ratio of about 1:3. High-serum total cholesterol, and/or LDL cholesterol, and low HDL cholesterol concentrations are considered high risk factors for arteriosclerosis, the major cause of death in the United States characterized by focal fatty thickening in the inner aspects of large arterial vessels supplying blood to the heart, brain, and other vital organs. For more than a century scientists have associated these atherosclerotic lesions with the accumulation of lipids, specifically cholesterol and its esters, upon the inner layers (intima) of large arteries [Small, D. M. and G. G. Shipley, Science 185:222-229 (1974); D. M. Small, The Lymen Duff Lecture: "Progression and Regression of Atherosclerotic Lesions", given at the 59th Scientific Session of the American Heart Association, Dallas, Texas, November 1986 and published in Arteriosclerosis, Vol. 8, pages 103-129; D. M. Small, "The Physical State Of Lipids Of Biological Importance: Cholesterol Esters, Cholesterol, Triglyceride", Surface Chemistry Of Biological Systems, Plenum Press, 1970 pages 55-83]. This has also lead to considerable research on the solubility and distribution of cholesterol, saturated fats, and other lipids within human and animal tissues and within a variety of different fats and oils. For more detailed information regarding cholesterol solubility and cholesterol in its various crystalline forms, the following reference is recommended, the text of which is expressly incorporated by reference herein: D. M. Small, The Physical Chemistry Of Lipids From Alkanes To Phospholipids, Plenum Press, 1986.

It will be noted and appreciated that the long-term nutritional and health results of eating less cholesterol and less saturated fat in our diets have been discussed and recognized by the American Heart Association and the National 23 Cholesterol Education Program [Arch. Intern. Med. 148:36-69 (1988)]. It is now generally believed that a marked decrease in cardiovascular disease could occur if the dietary intake of saturated fat and cholesterol were seriously reduced in the American population. Cardiovascular disease is still by far the major killer of people in Western society and major steps have been implemented to reduce this epidemic common to those with a high standard of living. In the opinion of the National Cholesterol Education Committee and the American Heart Association, a decreased intake of dietary cholesterol and saturated fat would mediate and have a marked effect in reducing the incidence of cardiovascular disease.

Several approaches have been undertaken to try and reduce the dietary intake of cholesterol and saturated fat by the American public. One approach has been to educate the public regarding nutrition and health risks regarding the kinds of foods containing high cholesterol and high saturated fats; this has resulted in a major shift in the eating habits of the consuming public away from foods such as hard cheese and fatty red meats towards those foods such as fish and fowl containing substantially less cholesterol and saturated fat. Another approach has been to treat or process meats from various animal sources to reduce their fat content. These typically have taken three forms: The removal of fat from meat by mechanical means such as a crusher, a press or cutting tools; physical treatments including heat, light, and reactive gas; and chemical treatments with water or strong chemical reagents. The presently available mechanical apparatus modes of treatment are exemplified by U.S. Pat. Nos. 4,776,063; 3,780,191; 3,748,148; and 3,685,095; Japanese patent publication Nos. 62265396 (871118); 61158763 (860718); French Pat. No. 2,187,229; and British Pat. No. 1179418. The conventionally known heat and other physical treatments of meat are represented by Japanese patent Publication Nos. 62278967 (871203), 61058533 (860325), 59173070 (840929), 59084993 (840516), 58187496 (831101); Soviet Union Publication Nos. 1153874 (850507), 627810 (780821), 502011 (760825), 1318420 (690331); and U.S. Pat. Nos. 4,778,682; 3,687,819; 3,780,075; and 3,532,593. The previously used chemical treatments of meats are illustrated by Soviet Union Publication Nos. 1329737 (870815), 1063824 (831230) 1017684 (830515); German patent Publication Nos. 200156 (830323), 3169440 (850425), 2119608 (710422); Japanese patent Publication Nos. 56018537 (810221), 55156569 (801205), 54003099 (790111), 52040473 (770329); and U.S. Pat. Nos. 3,794,743; and 3,532,593 respectively.

Despite all these innovations, the currently known procedures collectively and cumulatively are and remain ineffective for the purpose of substantially reducing cholesterol and the associated saturated fats from meats and fowl. All of the generally known and available procedures typically involve the grinding or crushing of meat and/or its chemical and physical extraction with hot water, or steam, or heat, or pressure, or some combination of these treatments. The technical problem remaining unappreciated and unresolved to date in the removal of cholesterol and saturated fats relates to their location in the meat obtained from animals. Virtually all of the cholesterol within edible meats exists in the free form and is located in the membranes of the cells within the meat tissue rather than in the meat (muscle) itself. Cholesterol and saturated fats, can of course be analytically extracted and quantitatively measured by grinding meat and using strong organic solvents such as chloroform and methanol; however, neither cholesterol nor saturated fat can be effectively extracted from edible meats and meat products simply by employing heat, water, or steam. Water and steam can be employed to melt some fats, particularly triglycerides, which then can be physically removed in part; nevertheless, these treatments cannot extract the cholesterol or change the saturated fatty acid character of meat, particularly with red meats such as beef, pork and lamb. Accordingly, it will be recognized and appreciated that there remains a long standing, recognized need for improved methods for reducing the cholesterol content and saturated fat content of meats in general. Similarly, the use of such methods to produce meat and meat products with markedly reduced cholesterol and saturated fat would be recognized as a major advance in reducing the dietary intake of saturated fat and cholesterol leading to a marked decrease in cardiovascular disease.

SUMMARY OF THE INVENTION

The present invention provides methods for reducing the saturated fat and cholesterol content of meat, the most comprehensive method comprising: obtaining raw meat in a fragmented state; heating the fragmented meat in an unsaturated oil to a temperature not substantially less than 100° C.; allowing the heated fragmented meat and the heated unsaturated oil to form an oil adherent meat mixture such that at least a portion of the saturated fat and cholesterol of the fragmented meat becomes solubilized and extracted by the heated unsaturated oil; washing the oil adherent extraction mixture with a heated aqueous fluid such that at least a portion of the extracting oil containing the solubilized and extracted saturated fat and cholesterol becomes separated from the oil extracted meat and removed by the heated aqueous fluid washings; and isolating the removed extracting oil and aqueous fluid washings from the washed and oil extracted meat fragments.

The present invention also separates the removed extracting oil from the aqueous fluid washings as individual fractions. In this manner three different products are obtained: a meat product having reduced saturated fat and cholesterol content; an oil extraction product comprising solubilized saturated fat and cholesterol from animal sources; and an aqueous meat and stock flavoring product substantially without fat and cholesterol.

DETAILED DESCRIPTION OF THE FIGURES

Figure 1A:
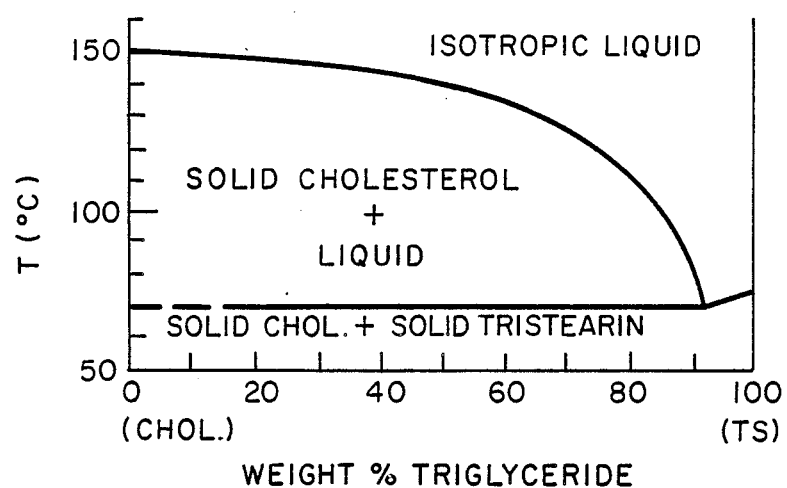
Figure 1B:
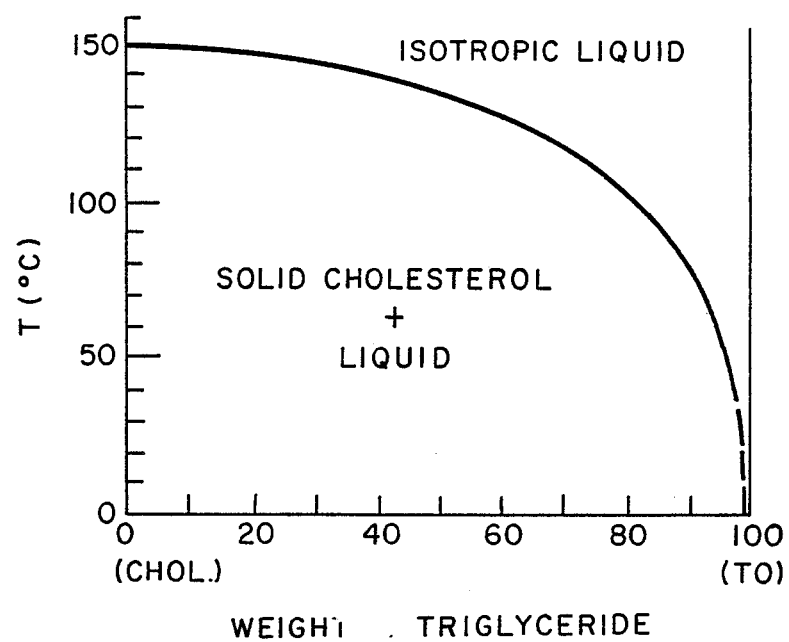

The present invention may be more easily and completely understood when taken in conjunction with the accompanying drawing, in which:

FIG. 1 is a graph illustrating the solubility characteristics of binary mixtures of simple triglycerides and cholesterol with regard to increasing temperature.

DETAILED DESCRIPTION OF THE PREFERRED EMBODIMENTS

The present invention, in the main, is a process which partially extracts cholesterol from meat and exchanges the saturated fats in meat for unsaturated fats and oils. The primary resulting product is a meat with markedly reduced saturated fat and diminished cholesterol content. In addition, the secondary products provided by the unique process yield a meat flavoring agent substantially without fat or cholesterol which may be employed as a meat stock and/or flavoring product; and an oil extraction product comprising the extracting oil, solubilized saturated fat and cholesterol from animal sources. Each of these has major value and uses in their own right.

When the methods of the present invention are properly employed a number of unique and substantial benefits and advantageous result. These include:
1. A marked decrease in cholesterol content for the meat, typically in the order of a 30% difference.
2. A moderate decrease in total fat for the meat, typically in the order of 5–10%.
3. The saturated fats of the meat are largely exchanged for unsaturated vegetable oil fats, the order of exchange being about 70%.
4. The ability to retain the original meat flavors after processing for reduced cholesterol and saturated fat via reintroduction of the meat flavors and stock products obtained as a byproduct of the methodology.
5. A treatment method which is simple to perform and does not require any sophisticated equipment or apparatus.
6. The ability to substantially reduce risk of cardiovascular disease by a nutritional diet employing treated meats having diminished cholesterol and saturated fat content.

The immediate uses for the methods of the invention are deemed to be very wide spread and valuable to both the individual and the commercial world. Clearly, the techniques described are directly useful in the kitchen of any individual to process meats purchased from grocery stores, butcher shops and normal consumer outlets. In addition, the described methods may be used commercially to produce treated meats with reduced cholesterol and diminished saturated fat content which can be marketed as processed meat in fresh, frozen, or canned form; or as prepared foods such as hamburgers, sausages, tacos, chilis, meat sauces, and the like. Since the products of the described methods yield process meats which retain their original flavors, the variety of foods and food applications in which the process meat products could be employed is enormous.

The methods for reducing the saturated fat, total fat, and cholesterol content of meat comprise a variety of different steps based upon the use of unsaturated oils, typically from vegetables or plants, as a solvent because such vegetable oils are not only edible but also because they will dissolve cholesterol and exchange the saturated animal fat for the monounsaturated fat and polyunsaturated fat of the vegetable oil. Thus, those fats left in the meat after processing will be largely from vegetable oil sources. The method then partially removes the solvent vegetable oils by using boiling water or steam to wash and to remove the adherent extracting oil from the meat itself. The water/oil mixture of washings obtained in this manner may then be easily separated into individual oil fractions and water fractions and then used independently.

Although the steps of the described methods are relatively simple and uncomplicated, it is useful to describe in detail each manipulative step in order to fully appreciate and recognize its purposes and actions. Accordingly, each manipulative step will be described individually hereinafter.

Obtaining Raw Meat in A Fragmented State

The present invention intends that raw meat from any animal source be used as the initial material to be processed. The meat may come from any animal source including mammals, reptiles, and birds. Accordingly the meats include beef, veal, and all meat products from cattle; lamb, mutton, and all meat products from sheep;

pork, ham, and all meat products from pigs and swine; and chicken, turkey, duck, goose, and any kind of domestic or wild fowl. It is not required that the raw meat be only of one kind or obtained from only one source; to the contrary, many recipes and human needs require mixtures of different kinds of meat from various sources. Accordingly, neither the nature, source, type, or quality of meat is deemed to be a relevant or restrictive factor for purposes of practicing the present invention.

In preferred instances, it is most desirable that the meat be raw rather than partially or completely cooked. Cooking and other treatment processes destroy the tissues, membranes, and cellular arrangements of the intact meat; and make the extraction process described herein more difficult to be used effectively. On the other hand, the raw meat need not be fresh meat as such; the techniques of freezing, cold storage, salting, drying, and other conventional means for preserving meat without cooking are all deemed to provide meat in a form which is useful for treatment by the present invention.

It is most desirable that the meat to be treated be in a fragmented form rather than in bulk or chunk form. Fragmented meat provides a greater surface area and more effective means of access for the oil and water treatment steps of the present invention. In its most preferred form, the meat has actually been prepared in ground or minced form. Alternatively, however, the meat need not be completely pulverized but may be employed after chopping, shredding, piercing, crushing, and any other form which provides fragmented meat particles of varying sizes. For purposes of the present invention, the actual size of the meat particle and the manner in which the meat has been fragmented is of no import; so long as the meat is in some recognizable fragmented state, it is deemed suitable for use within the methods of the present invention.

Heating The Fragmented Meat In An Unsaturated Oil To A Temperature Not Substantially Less Than 100° C.

For purposes of the present invention, any oil from any source may be employed. Typically, unsaturated oils are obtained from plants and vegetables and contain varying percentages of monounsaturated and/or poly-unsaturated oils depending upon their source of origin. The degree of mono and poly-unsaturation is of minor importance; and the user may choose from among the varying sources and types of plant vegetable or even synthetic oils as his needs or personal desires dictate. Accordingly, oils such as olive oil, corn oil, safflower oil, canola oil, soy oil, grape seed oil, peanut oil, cottonseed oil, and even the more saturated coconut oils, partially hydrogenated vegetable oils, or medium chain triglycerides could be used depending upon what fatty acids are deemed most desirable, cheapest, or least susceptible to spoilage. Even synthetic, non-hydrolysable oils such as erythritol tetraoleate or sucrose polyester ("Olestra", Proctor & Gamble Co.) could be used. If such synthetic oils were employed, the absorable fat in the extracted meat product would then be reduced to about 30% of that present in the raw meat. In preferred embodiments, however, the more unsaturated the oil, the better the results in reduced saturated fat.

To be useful within the method described herein, the temperature of the unsaturated oil must be raised for a period of time to a value not substantially less than about 100° C. As illustrated by FIG. 1, the solubility of cholesterol increases exponentially to total miscibility at the melting point of cholesterol, 150° C. The solubility at 100° C. is about 25 grams of cholesterol per 100 grams of triolein (an unsaturated oil chemically similar to olive oil). This is a marked increase in solubility in comparison to cholesterol solubility at 37° C. in various oils (3–4 grams per 100 grams oil) as shown by Table 1 below. Thus, for example, if 100 grams of red meat contains between 0.2–0.4 grams of cholesterol, it is clear that all the cholesterol in that meat can be readily dissolved in a few grams of unsaturated oil at a temperature of 100° C.

TABLE I[A]

| Organic Solvent | Aqueous Phase Present | Temp. (° C.) | Solubility* |
| --- | --- | --- | --- |
| MCT oil | Yes | 37 | 5.04 |
| Coconut oil | Yes | 37 | 4.97 |
| Beef fat | Yes | 37 | 4.45 |
| Butter oil | Yes | 37 | 4.12 |
| Chicken fat | Yes | 37 | 4.11 |
| Cocoa butter | Yes | 37 | 4.07 |
| Corn oil, hydrogenated | Yes | 37 | 4.00 |
| Goose fat | Yes | 37 | 3.94 |
| Castor oil | Yes | 37 | 3.82 |
| Olive oil | Yes | 37 | 3.72 |
| Lard | Yes | 37 | 3.63 |
| Corn oil | Yes | 37 | 3.59 |
| Rapeseed oil | Yes | 37 | 3.57 |
| Peanut oil | Yes | 37 | 3.43 |
| Cottonseed oil | Yes | 37 | 3.26 |
| Soybean oil | Yes | 37 | 3.13 |
| Safflower oil | Yes | 37 | 2.95 |
| Codliver oil | Yes | 37 | 2.70 |
| Triolein | No | 21 | 2.8 |
|  | Yes | 21 | 1.9 |
| Triolein (isolated from TO-H$_2$O emulsion | No | 21 | 2.8 |
|  | Yes | 21 | 1.8 |
| Triolein | No | 21 | 2.1 |
|  | Yes | 21 | 1.9 |
|  | No | 37 | 4.3 |
| Triolein | Yes | 37 | 3.2 |

*radiolabeled assay
[a]medium chain triglycerides composed almost exclusively of C$_8$ and C$_{10}$ triglycerides
[Δ]source: D.M. Small. The Physical Chemistry of Lipids from Alkanes to Phospholipids. Plenum Press, 1986, pp. 408-411.

For best results, a gradual initial heating of the fragmented raw meat and the unsaturated oil is most Preferred. Initially, the fragmented raw meat is added to an unsaturated oil which has been previously heated to only about 80°–90° C. The meat and heated oil are combined and allowed to interact at the 80°–90° C. temperature for about 5 minutes duration. This limited time interval at 80°–90° C. allows all the meat fat to melt; allows the heated oil to penetrate into the thickness of the meat fragments; and begins the process of oil extraction and fat exchange. Subsequent to this initial interval, the mixture of fragmented meat and unsaturated oil is heated to a temperature not substantially less than 100° C.

It is most desirable that the unsaturated oil be heated to a temperature in the range between 100° and 160° C. (about 212°–320° F.). There are several reasons for heating the unsaturated oil to this elevated temperature range. First, the oil heated at this temperature will cause the water inherent in the raw meat to evaporate. Second, the oil heated to this temperature will continue to penetrate the raw meat and act as an extracting oil agent for cholesterol. Third, when mixed with the heated oil at these temperatures, the animal fat of the raw meat will entirely melt, become solubilized, within, and become carried by the unsaturated oil. Fourth, at these temperature ranges above 100° C., collagen - the major structural protein component of meat becomes melted and dissolves to form a soluble gelatin thereby aiding in the penetration of the extracting unsaturated oil into the tissues of the meat. Lastly, unsaturated oil heated to these temperatures serves to begin actual cooking of the meat. All of these events are the direct consequence of heating and using unsaturated oils with raw meat at temperatures substantially between 100°-160° C.

It will be noted and appreciated that the preferred temperature range of 100°-160° C. is not the only temperature to which the unsaturated oils may be heated and used. Clearly, there is nothing to prevent the user from heating the unsaturated oils to temperatures well above 160° C. and then employing such heated oils within the described process. Nevertheless, heating the unsaturated oil to temperatures substantially above 160° C. creates inherently undesirable side-effects and disadvantages which include: a thermal degradation and chemical decomposition of the unsaturated fats within the oil at overly elevated temperatures; the smoking and flashing (ignition) of extremely light, volatile oils at higher temperatures; and an unnecessary loss of oil volume due to thermal decomposition as a result of overheating. It is for these reasons that the preferred range be between about 100° and 160° C.

It will be noted, however, that some temperatures below 100° C. could be employed to achieve the desired effects within the fragmented meat particles. At such lower temperatures, the oil extraction becomes ever less efficient; and the time interval required to obtain any meaningful result grows ever larger. This is particularly the case if temperatures less than 100° C. (the boiling point of water) are employed.

Combining The Fragmented Raw Meat With The Heated

Unsaturated Oil

When combining the fragmented raw meat at ambient room conditions with the heated unsaturated oil, it is desirable that the ratio of meat to oil be maintained between 2:1 and 1:2 (weight of meat to volume of oil). Ratios of meat to oil outside the preferred range may be employed to suit the user's needs or personal requirements. Nevertheless, such lower and higher ratios are deemed generally wasteful and less effective then the preferred range between 2:1 and 1:2 respectively.

As noted, previously, a thorough mixing between the fragmented meat and the unsaturated oil at a temperature not substantially less than 100° C. is necessary in order to allow the oil fully to penetrate and to extract the cholesterol and saturated fat from the meat. Any suitable container or apparatus found in the consumer's kitchen or in commercial use may be employed for this purpose. Similarly, in many instances where extremely large volumes of meat and oil are being mixed, it is useful to have a mechanical mixing apparatus to perform the physical act of mixing the oil and meat in an effective and rapid manner. The overall contact time between the unsaturated oil at 100° C. (or greater) and the fragmented raw meat should last only between 5 and 10 minutes approximately. Physical mixing during this preferred contact time interval may be sporadic, occasional, or continuous depending on the actual circumstances of use. During this contact time interval, the heated unsaturated oil not only melts and dissolves the saturated fat (triacylglycerol) which exists as a partially crystalline solid at ambient room temperature in the fragmented meat but also acts to solubilize the cholesterol as well. In this manner, the heated unsaturated oil extracts major portions of the original saturated fat and cholesterol content of the fragmented meat in a very short time period.

It will be noted and appreciated that the act of mixing the fragmented meat with the heated unsaturated oil physically forms an oil adherent extraction mixture: and the process of solubilization and extraction by the heated unsaturated oil occurs as a result of the oil adherent nature of the resulting mixture itself. It is not desirable to let the hot extraction mixture become cooled to any meaningful extent. This is the major reason why the contact and extraction time intervals are preferably maintained at the minimal 5-10 minute duration. Clearly if the oil adherent extraction mixture cools substantially below 100° C., the solubilized saturated fats mass precipitate out - thereby defeating one of the very purposes of heating the unsaturated oil. Accordingly, it is most desirable that the combined fragmented raw meat and heated unsaturated oil remain in contact for a limited time period to avoid the consequences of cooling.

Washing The Oil Adherent Extraction Mixture

Once the saturated fat has been exchanged and the cholesterol extracted by the heated unsaturated oil, the oil adherent extraction mixture is washed with a heated aqueous fluid such that at least a substantial portion of the adherent extracting oil (now containing the solubilized and extracted saturated fat and cholesterol) becomes separated from the meat and is removed by the aqueous fluid washings. In general, the heated aqueous fluid can take one of two forms: boiling water or steam. If boiling water is used, the ratio of boiling water to oil is preferably in the range of about 1:1-1:2 (volume of water:volume of oil). The boiling water may optionally contain salts and/or emulsifiers and/or degreasers which are compatible with edible food products intended for human consumption. The boiling water is used to partly extract and wash at least part of the adhering oil from the oil adherent meat mixture. To be successful, an adequate amount of water needs to be forcefully applied to the adherent oil in order to effect a good separation from the meat mixture. The washing with the boiling water also effectively separates the meat juices and meat flavors from the meat and oil mixture which are recovered and used subsequently.

In the alternative, steam may be employed which would be forced upon the oil adherent meat extraction mixture under pressure to separate and remove the extracting oil containing the solubilized saturated fat and cholesterol. Under these conditions, the steam condensate would be collected as aqueous fluid washings, preferably, the ratio of steam condensate to the unsaturated oil should be in a similar ratio to that of boiling water, that is in the range about 1:1 to 1:2, volume to volume.

It should be noted that the preferred embodiments for the aqueous fluid are water which has been heated to boiling or water which has been superheated into steam. This degree of heat provided by the aqueous fluid clearly aids in the separation and removal of the adherent oil from the extracted meat fragments in the mass. Since the manipulation is intended to be performed at ambient environmental pressures, it is desirable that the aqueous fluid be heated as much as possible to achieve the intended goal. While the aqueous fluid is preferably boiled or superheated into steam, it is recognized that under some conditions the water can be heated to less than boiling and still obtain some useful effect as an aqueous washing upon the oil adherent meat mixture. Although far less preferred, these embodiments are deemed to be operative to achieve the intended purpose in some generic and measurable degree. For this reason, the aqueous fluid need not be either boiling or superheated into steam; to the contrary, it is required only that the aqueous fluid be heated to such a degree that it can achieve the intended goal of separating and removing the adherent extracting oil in order to be within the scope of the present invention.

Isolating The Removed Extracting Oil And Aqueous Fluid Washings

Regardless of whether the aqueous fluid is merely heated, boiling, or in the form of steam, it is intended and desirable that the extracting oil removed by the aqueous fluid washings be isolated and removed from the washed and oil extracted meat fragments. This manipulation is most easily accomplished using apparatus or mechanical means such as a sieve or similar perforated container which will retain the fragmented mass and yet allow the removed oil and aqueous fluid washings to pass through After the aqueous fluid washings containing the extracting oil from the meat mass have been removed, the fragmented meat is ready for cooking or other use immediately. The fragmented meat at that moment has a reduced cholesterol and fat content; and has exchanged the saturated fats in substantial proportion for the unsaturated fats of the oil. The process fragmented meat mass may then be used as is for any food or consumption purpose immediately without any further processing or treatment In the alternative, however, it will be recognized that much of the meat flavoring and meat stock has been removed from the processed fragmented meat as a result of washing the adherent extracting oil from the meat mass. It is most desirable, for flavoring and for aesthetic purposes, to recover the meat flavoring and stock from the aqueous fluid washings; and then to recombine the meat flavorings and stock with the processed meat fragments to enhance their taste and food appeal. This is accomplished by the following manipulations.

Separating The Extracting Oil From The Aqueous Fluid Washings As Individual Fractions Since the washings recovered from the meat mass are a mixture of water and oils, it is useful to separate the water from the oil as individual fractions; and then to utilize the separated aqueous fraction and the separated oil fraction independently. The preferred separation process of oil from water is most easily achieved by the gravity force separation which occurs rapidly using a minimum of technology. The isolated fluid washings containing water and extracting oil are first poured into a container of suitable volume; and then allowed to stand in the cold, preferably about 4° C. for a time interval between a few minutes to several hours. During this time interval, the extracted saturated fat and cholesterol from the meat solidifies and congeals forming a partly crystalline, waxy-like mass. This solidified mass lies as a distinct and separable layer and can be physically lifted and separated from the surface of the virtually fat and cholesterol free aqueous phase beneath it. The cooling and gravity separation process is a common phenomenon which has been utilized frequently in the home and in commercial settings countless times under many different conditions. Nevertheless, it provides a simple and complete separation process in minimal time resulting in independent oil and aqueous fractions. Other means for separating the oil and aqueous phases from the isolated aqueous fluid washings may be employed if desired, the means varying with the expected use and need circumstances. Representative of these other mechanisms of separation are floatation and vacuum suction techniques conventionally known and used in industrial environments.

Once isolated as a separated individual aqueous fraction, the aqueous fluid will contain the bulk of the meat flavorings and meat stock without any meaningful amount of saturated fat or cholesterol. This aqueous fraction may then be employed as a flavoring agent or as a meat stock immediately without further treatment. Accordingly, the aqueous fraction may be recombined with the processed fragmented meat to add flavoring and meat stock for the extracted meat now having diminished cholesterol and saturated fat. Alternatively, the aqueous fraction may be employed as an additive for other foods to enhance the meat flavoring or the meat stock content of the foods.

In comparison, the separated oil fraction containing the concentrated saturated animal fat and cholesterol may also be used for a number of other purposes. This oil fraction may be added to other foods in which cholesterol and saturated fat are not a concern; or can be employed in a variety of industrial processes where saturated fat and/or cholesterol is useful in a non-food capacity. Such non-food uses would include the synthesis of emulsifiers, soaps, detergents, plastics, and the like. Clearly therefore, the oil fraction containing abundant amounts of saturated fat and useful quantities of cholesterol has great commercial value and use. Finally, a low cholesterol, unsaturated oil product could be reclaimed by cold pressing of the partly crystalized oil extract fraction.

In order to demonstrate the utility and effectiveness of the present methods, a variety of experiments were conducted and the empirical results evaluated. These are described in detail hereinafter. It will be understood and appreciated, however, that these experiments merely illustrate and empirically evidence the essence of the present invention; and do not in any manner restrict or limit the scope of the present invention to either the experimental design or the reported data.

Experiments And Empirical Data

The experiments employed the method as described in detail previously herein. To demonstrate the differences, chemical analysis were carried out in triplicate on the following:
(a) uncooked ground beef purchased from a supermarket;
(b) processed ground beef from the same package;
(c) the extracting unsaturated oil before use in the described method;
(d) the extracting unsaturated oil after use in the present invention; and (e) the aqueous fraction isolated and separated from the fluid washings obtained via the described methodology.

Procedurally, the individual weights of the ground meat were measured by balance and the volumes of the extracting unsaturated oil measured by volumetric methods conventionally known. For the unextracted ground beef and for the processed (extracted) ground beef the following were measured: the dry weight; and the total lipids by not less than six different methods including Folch extraction [Folch et al., J. Biol. Chem. 226:497 (1957)]; triglyceride content [Sigma Chemicals Kit #320-UV]; total cholesterol content Tallman L., Varian Instruments At Work No. LC-119; Supplies Catalogue #17 Supleco Chromatographic 1990; p. 25]; total phospholipids Bartlett, G.A., J. Biol. Chem. 234:466 (1959)]; and sterol separation by HPLC separation and cholesterol by gas/liquid chromatography 9 [Supleco Chromatographic Supplies Catalogue, 1980, #17]; and fatty acid content by gas-liquid chromatography of the methyl esters [Morrison, W. H. & L. M. Smith, J. Lipid Res. 5:600 (1965)]. The unsaturated extracting oil employed, puritan oil, was measured for fatty acid composition and sterol composition by these methods. The oil phase following extraction of the fragmented ground beef was measured for fatty acid content by gas-liquid chromatography and independently measured for sterols by gas-liquid chromatography because plant oil such as puritan oil, corn oil, safflower oil, and olive oil contain no cholesterol but do contain plant sterols. Some of these plant sterols give a positive colorimetric test for cholesterol and thus their isolation by HPLC technique and quantitation by gas-liquid chromatography of the different sterols was necessary to identify and quantitate the cholesterol content of the extracting oil obtained after combination with the fragmented ground beef. Finally, in the aqueous fraction, the total lipids were extracted by Folch technique and the different lipid classes estimated by thin layer chromatography and the sterols measured by gas/liquid chromatography. The results of these analysis are summarized by Tables II–VIII respectively.

TABLE II

| Starting Material | |
|---|---|
| Raw beef total wet weight | = 75.4 G |
| Extracted beef total wet weight | = 46.2 G |
| Vol. of oil phase | = 103 ml |
| Vol. of aqueous phase | = 102 ml |

TABLE III

| | Dry (Lyophilizede) Weight | | |
|---|---|---|---|
| sample | aliquot wet (gm) | aliquot dry (gm) | % dry/wet |
| raw (d) | 1.06 | 0.43 | 40.6 |
| raw (e) | 1.04 | 0.42 | 40.4 |
| raw (f) | 1.00 | 0.42 | 42.0 |
| | | mean | 41.0 |
| | | std. dev. = | 0.87 |
| processed (a) | 1.09 | 0.46 | 42.2 |
| processed (b) | 1.00 | 0.43 | 43.0 |
| processed (c) | 1.05 | 0.45 | 42.9 |
| | | mean | 42.7 |
| | | std. dev. = | 0.44 |

TABLE IV

| (Amount of Lipid in Beef) | | | |
|---|---|---|---|
| raw, unextracted | | extracted | |
| sample | mg/G dry wt | sample | mg/G dry wt |
| raw (d) | 530 | (a) | 444 |
| raw (e) | 493 | (b) | 462 |
| raw (f) | 500 | (c) | 451 |
| mean | 508** | | 452** |
| std deviation | 19.6 | | 9.07 |
| std error | 11.3 | | 5.24 |

**$p < .001$

TABLE V

| | Weight Percentage Lipid |
|---|---|
| sample | grams lipid/100 grams material |
| raw meat | 20.8 |
| processed | 18.5 |
| aqueous fraction part of washings | 0.0174 |

TABLE VI

Sterol Analysis

A. Cholesterol
1. hamburger:

| sample | mg chol/G dry weight | |
|---|---|---|
| raw (D) | 2.6 | |
| raw (E) | 2.7 | |
| raw (F) | 2.7 | |
| mean | 2.7* | SD = 0.06 |
| processed (A) | 2.4 | |
| processed (B) | 2.0 | |
| processed (C) | 1.7 | |
| mean | 2.0* | SD = 0.35 |

*$p < .05$ 2. extracting oil:
32 mg cholesterol in 103 ml extracting oil

B. Sterols
1. % distribution of sterols

| sample | chol. | camp-esterol | stig-mosterol | b-sito-sterol |
|---|---|---|---|---|
| raw (D) | 100 | 0 | 0 | 0 |
| raw (E) | 100 | 0 | 0 | 0 |
| raw (F) | 100 | 0 | 0 | 0 |
| processed (A) | 65. | 7.2 | 8.7 | 19. |
| processed (B) | 66. | 6.5 | 7.8 | 20. |
| processed (C) | 67. | 7.1 | 8.3 | 18. |
| mean | 66. | 6.9 | 8.3 | 19. |
| oil extract | 20. | 16. | 21. | 44. |
| oil before use in extracting procedure | 0 | 21. | 27. | 52. |

TABLE VII

| sample | | Tri-glycerides | Phos-pholipids | Chol esterol | % recovery |
|---|---|---|---|---|---|
| processed (a) | | 96.7 | 2.90 | 0.50 | 105. |
| processed (b) | | 97.1 | 2.80 | 0.42 | 105. |
| processed (c) | | 96.7 | 2.96 | 0.35 | 106. |
| | mean | 96.8 | 2.89 | 0.42 | |
| | sd | 0.23 | 0.08 | 0.08 | |
| raw (d) | | 97.6 | 1.85 | 0.44 | 112. |
| raw (e) | | 97.2 | 2.36 | 0.50 | 111. |
| raw (f) | | 97.4 | 2.05 | 0.49 | 112. |
| | mean | 97.4 | 2.09 | 0.48 | 112. |
| | sd. | 0.2 | 0.26 | 0.03 | |
| oil extract | | 99.96 | — | 0.03 | 107. |
| puritan oil | | ~100. | — | — | 108. |
| aqueous fraction of extract | | 92 | 8 | 0 | — | t = normalized to 100%

TABLE VIII

| | Distriution of Fatty Acids[t] | | | |
|---|---|---|---|---|
| fatty acids | Raw Mean | Raw Standard Deviation | Processed Mean | Processed Standard Deviation |
| 14:0 | 3.36 | 0.11 | 1.09 | 0.10 |
| 14:1 | 1.11 | 0.99 | 0. | 0. |
| 16:0 | 29.18 | 0.53 | 17.51 | 0.35 |
| 16:1 | 5.10 | 0.19 | 2.05 | 0.20 |
| 18:0 | 13.45 | 0.35 | 6.92 | 0.03 |
| 18:1 | 38.91 | 1.55 | 42.05 | 0.57 |
| 18:2 | 1.49 | 0.45 | 24.23 | 0.65 |
| 18:3 | 0.18 | 0.05 | 2.39 | 0.04 |
| unkn | 7.37 | 1.65 | 3.76 | 0.08 |
| ratio unsat/sat: | raw = 1.01 | | processed = 2.77 | | t = mole percent

The removal of beef fat (triglyceride) can be monitored by following the decrease in myristic acid content since this acid was virtually absent in the extracting oil. The raw meat had about 3.4 mole while the extracted meat had only about 1 mole%. This is equivalent to a 70% decrease in beef fat.

The substitution of unsaturated oil triglycerides for meat fat triglycerides may be estimated by examining the enrichment of linolenic acid (18:3) an acid almost exclusively found in the extracting oil. The extracting oil had 3.94 mole% 18:3 and raw beef had just 0.18 mole% of 18:3. Since 70% of the beef fat was extracted in the procedure only 0.05 mole% of beef fat 18:3 was left in the extracted beef. However the extracted beef had 2.39 mole% 18:3 or 2.39−0.05 =2.35 mole% enrichment. This enrichment indicates that oil triglycerides replaced about −60% of the fat in meat.

As summarized by the data of Tables 11 through VIII the dry weights of the ground beef were similar ranging from about 41-42.7% of the raw unextracted meat dry weights. This reveals that about 59-56.3% of the original beef weight was water. The raw meat contained about 30% more cholesterol than the extracted beef sample, a major and substantial decrease in cholesterol content. The raw unextracted meat also contained more total fat than the extracted meat, another significant difference. It is estimated that about 35 milligrams of cholesterol was extracted from the 100 grams of raw meat initially used; and it was empirically found that 32 milligrams of cholesterol existed in the recovered 103 milliliters of extracting oil thereby confirming the overall extraction capability. The fatty acid distribution of the raw and extracted meat are very different with highly significant decreases in the saturated fat levels [14:0 (myristic), 16:0 (palmitic), and 18:0 (stearic)]; and also revealed large increases in the monounsaturated and particularly polyunsaturated fatty acids. This emprically results in the unsaturated: saturated ratio (U/S ratio) being increased from 1 in raw unextracted meat to 2.77 for extracted ground beef—a major difference and increase. Assuming the unknown fatty acids are polyunsaturates, the well known polyunsaturated to saturated ratio, i.e., the P/S ratio was improved from 0.2 in the raw meat to 1.2 in the processed sample.

In summary therefore, the raw unextracted ground beef had 115 milligrams of cholesterol per 100 grams of beef and had 20.8% total fat. In comparison, the processed (extracted) ground beef has 80 milligrams of cholesterol per 100 grams of beef and had 18.5% total fat. Both the decrease in cholesterol and total fat content are significant.

The present invention is not to be restricted in form nor limited in scope except by the claims appended hereto.

What I claim is:

1. A method for reducing the saturated fat and cholesterol content of meat, said method comprising:
    obtaining raw meat in a fragmented state;
    heating said fragmented meat in an unsaturated extracting oil to a temperature not substantially less than 100° C.;
    mixing said heated fragmented meat and said heated unsaturated extracting oil to form an oil adherent meat mixture such that at least a portion of the saturated fat and cholesterol of said fragmented meat becomes solubilized and extracted by said heated unsaturated oil;
    washing said oil adherent meat mixture with a heated aqueous fluid such that at least a substantial portion of said extracting oil containing said solubilized and extracted saturated fat and cholesterol becomes separated from said meat and removed by said heated aqueous fluid; and then
    isolating said removed extracting oil and aqueous fluid from said washed and oil extracted meat fragments.

2. A method for reducing the saturated fat and cholesterol content of meat, said method comprising;
    obtaining raw meat in a fragmented state;
    heating said fragmented meat in an unsaturated extracting oil to a temperature not substantially less than 100° C.;
    mixing said heated fragmented meat and heated unsaturated extracting oil to form an oil adherent meat mixture such that at least a portion of the saturated fat and cholesterol of said fragmented meat becomes solubilized and extracted by said heated unsaturated oil;
    washing said oil adherent meat mixture with a heated aqueous fluid such that at least a substantial portion of said extracting oil containing said solubilized and extracted saturated fat and cholesterol becomes separated from said meat and removed by said heated aqueous fluid;
    isolating said removed extracting oil and aqueous fluid from said washed and oil extracted meat fragments;
    separating said removed extracting oil from said aqueous fluid as individual fractions; and then
    combining said separated aqueous fluid with said washed and oil extracted meat fragments.

3. A method for isolating the saturated fat and cholesterol content of animal fat, said method comprising:
    obtaining raw meat in a fragmented state;
    heating said fragmented meat in an unsaturated extracting oil to a temperature not substantially less than 100° C.;
    mixing said heated fragmented meat and said heated unsaturated extractomg oil to form an oil adherent extraction mixture such that at least a portion of the saturated fat and cholesterol of said fragmented meat becomes solubilized and extracted by said heated unsaturated oil;
    washing said oil adherent meat mixture with a heated aqueous fluid such that at least a substantial portion of said extracting oil containing said solubilized and extracted saturated fat and cholesterol becomes separated from said meat and removed by said heated aqueous fluid;

isolating said removed extracting oil and aqueous fluid from said washed and oil extracted meat fragments;

separating said removed extracting oil from said aqueous fluid individual fractions; and then isolating said separated extracting oil fraction.

4. A method for isolating the meaty flavoring content of raw meat, said method comprising:

obtaining raw meat in a fragmented state;

heating said fragmented meat in an unsaturated extracting oil to a temperature not substantially less than 100° C.;

mixing said heated fragmented meat and said heated unsaturated extracting oil to form an oil adherent meat mixture such that at least a portion of the saturated fat and cholesterol of said fragmented meat becomes solubilized and extracted by said heated unsaturated oil;

washing said oil adherent meat mixture with a heated aqueous fluid such that at least a substantial portion of said extracting oil containing said solubilized and extracted saturated fat and cholesterol becomes separated from said meat and removed by said heated aqueous fluid;

isolating said removed extracting oil and aqueous fluid from said washed and oil extracted meat fragments;

separating said removed extracting oil from said aqueous fluid as individual fractions; and then isolating said separated aqueous fluid fraction.

5. The method as recited in claim 1, 2, 3 or 4 wherein said raw meat is selected from the group consisting of pork, beef, veal, lamb, mutton, and fowl meat.

6. The method as recited in claim 1, 2, 3 or 4 wherein said unsaturated oil is a monounsaturated oil.

7. The method as recited in claim 1, 2, 3, or 4 wherein said unsaturated oil is a polyunsaturated oil.

8. The method as recited in claim 1, 2, 3 or 4 wherein said unsaturated oil is a vegetable oil.

9. The method as recited in claim 8 wherein said vegetable oil is at least one oil selected from the group consisting of olive oil, corn oil, safflower oil, canola oil, soy oil, grape seed oil, peanut oil, and cottonseed oil.

10. The method as recited in claim 1, 2, 3 or 4 wherein said unsaturated oil is a medium chain triacylglyceride.

11. The method as recited in claim 1, 2, 3 or 4 wherein said unsaturated oil is a synthetic oil.

12. The method as recited in claim 1, 2, 3 or 4 wherein said fragmented raw meat is selected from the group consisting of ground meat, chopped meat, minced meat, and shredded meat.

13. The method as recited in claim 1, 2, 3 or 4 wherein said unsaturated oil has been heated to a temperature ranging between 100°–160° C.

14. The method as recited in claim 1, 2, 3 or 4 wherein said aqueous fluid has been heated to boiling point.

15. The method as recited in claim 1, 2, 3 or 4 wherein said aqueous fluid is steam.

16. The method as recited in claim 1, 2, 3 or 4 wherein the ratio of raw meat to unsaturated oil is in the range from 2:1–1:2, weight to volume.

17. The method as recited in claim 1, 2, 3 or 4 wherein the ratio of aqueous fluid to unsaturated oil is in the range from 1:1–1:2, volume to volume.

18. The method as recited in claim 2, 3 or 4 wherein said separation of removed extracting oil from aqueous fluid occurs via gravity forces.

19. The method as recited in claim 2, 3 or 4 wherein said separation of removed extracting oil from aqueous fluid occurs via vacuum means.

* * * * *